July 31, 1956 — M. J. GILARDINO — 2,756,509
FIXTURE FOR WORKING ON LUMBER
Filed April 5, 1954

INVENTOR.
Mario J. Gilardino

United States Patent Office 2,756,509
Patented July 31, 1956

2,756,509

FIXTURE FOR WORKING ON LUMBER

Mario J. Gilardino, Northampton, Mass.

Application April 5, 1954, Serial No. 420,918

2 Claims. (Cl. 33—174)

This invention relates to improvements in tools and is directed more particularly to fixtures or holders for holding lumber or the like for marking, sawing, or otherwise working thereon.

The principal objects of the invention are the provision of a fixture or holder device for lumber to facilitate marking, scoring, sawing or otherwise working thereon.

The novel features of the invention provide a device adapted to hold or support lengths of lumber of various forms in various positions or planes so that the same may be marked, scored, sawed and otherwise worked thereon.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Figure 1:
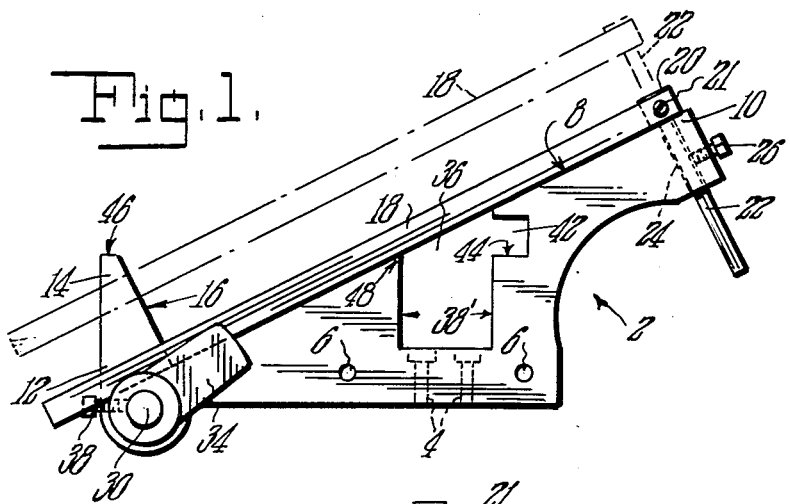
Fig. 1 is a side elevational view of a fixture embodying the novel features of the invention.

Referring now to the drawings more in detail, the invention will be fully described.

A holder or support is represented by 2 which may be used on a saw horse, bench or the like. In most cases two of the devices will be used in spaced relation and may be secured to a saw horse or bench. Openings 4 and 6 are provided for securing means such as bolts or screws.

The upper side or edge of the holder is provided with a face 8 declining from the rear end 10 to the forward end 12.

The end 12 is provided with an upstanding stop 14 having an inner face 16 which is preferably arranged at right angles to the face 8.

A straight edge 18 is provided which is carried by a head 20 of a stem 22 which is slidable up and down in an opening 24 of the end 10 of the holder.

In one way the straight edge 18 is pivoted at 21 to the head 20. As shown, the straight edge may be swung clockwise in a vertical plane. With screw 26 loosened the stem 22 may be rotated through a circle and the straight edge swung counterclockwise for locating said straight edge at a side of the holder opposite to that shown. As shown, side 18' of the straight edge aligns with side face 2' of the holder. It may align with an opposite face of the holder as well.

In use, the straight edge is brought down onto a board or plank such as, for instance, on board 28 on face 8 and against end face 16 of the holder. The straight edge may then be used for marking the board or sawing it and for various purposes.

Figure 2:
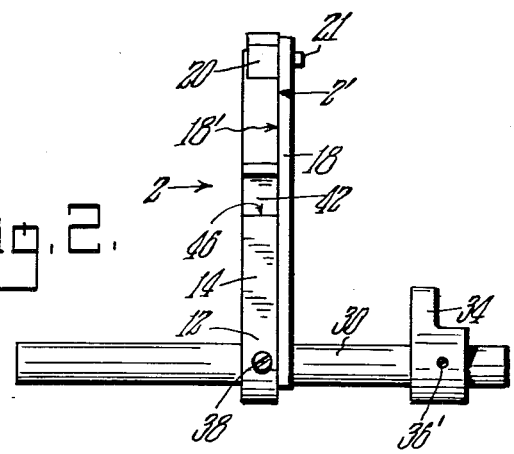
Fig. 2 is an end elevational view of the fixture shown in Fig. 1.

A gauge consists of a rod 30 reciprocable in an opening 32 of the end 12 of the holder and has a stop arm 34 adjustable thereon by means of a set screw 36', see Fig. 2. A set screw 38 of the holder, as in Fig. 2, may secure the rod 30 to the holder so that the arm 34 may be set and against which the end of a board may abut for locating said end relative to the straight edge for marking, sawing or the like.

Figure 3:
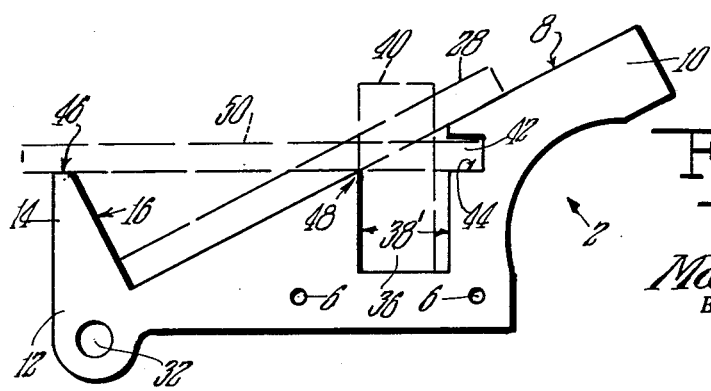
Fig. 3 is a side elevational view of the holder of the fixture shown in Fig. 1 to explain some of the ways in which lumber may be supported.

A vertical guideway 36 having horizontally spaced vertical sides 38' is provided to receive a board or length of lumber indicated by dash lines 40 in Fig. 3, so that said board is held for sawing or the like.

A horizontal guideway 42 is provided in a side of the guideway 36. Said guideway has a lower side 44 which is in the horizontal plane of an upper surface 46 of part 14 and upper corner 48 of guideway 36.

A length of board indicated by dash lines 50 in Fig. 3 may rest on 46 and 48 and the side 44 of the guideway 42 so as to be disposed horizontally for sawing or the like.

The straight edge being movable up and down, it may be brought to rest on a length of board for marking or sawing the board and the faces are so related that the straight edge when against the side of stop 14 will be at right angles to the longitudinal side edges of the board.

The guideways and surfaces facilitate lengths of lumber or board of various kinds being supported in numerous ways for convenience and accuracy in working thereon.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A device of the character described comprising in combination, a rigid holder having parallel vertical side faces and a horizontal lower side for resting on a support, said holder provided with an elongated upper board supporting surface declining downwardly and forwardly from rear to forward ends of said holder, a stop integral with the forward end of the holder extending upwardly from the upper supporting surface of the holder for an edge of a board on said surface, a stem rotatable and slidable in the upper end of the holder on an axis parallel to the side faces thereof and having an upper head, an elongated straight edge pivotally connected at one end to said head on an axis disposed at right angles to that of said stem and having a free end portion swingable to overly a board on said board supporting surface of the body.

2. A device of the character described comprising in combination, a rigid holder having parallel vertical side faces and a horizontal lower side for resting on a support, said holder provided with an elongated board supporting surface declining downwardly and forwardly from rear to forward ends of said holder, a stop integral with the forward end of the holder extending upwardly from the upper supporting surface of said holder for an edge of a board on said surface, a stem rotatable and slidable in the upper end of the holder on an axis parallel to the side faces thereof and having an upper head, an elongated straight edge pivotally connected at one end to said head on an axis disposed at right angles to that of said stem having a free end portion swingable to overly a board on said board supporting surface, a rod slidable and rotatable in the forward end of the holder on an axis at right angles relative to the side faces of said body, a stop arm slidable and rotatable on said rod for the end of a board on said upper supporting surface of the holder, means for binding the rod to the holder against movement, and means for binding said stop arm to said rod against movement.

References Cited in the file of this patent

UNITED STATES PATENTS

| | | |
|---|---|---|
| 262,851 | Stinson | Aug. 15, 1882 |
| 533,881 | Frazier | Feb. 12, 1895 |
| 687,209 | Drinkaus | Nov. 26, 1901 |
| 1,718,791 | Ludwig | June 25, 1929 |
| 1,947,912 | Leder | Feb. 20, 1934 |